United States Patent
Hopkins, II (10) Patent No.: US 9,426,845 B2
(45) Date of Patent: Aug. 23, 2016

(54) SELF-ADHESIVE RADIANT HEATING UNDERLAYMENT AND APPARATUS FOR MANUFACTURE

(71) Applicant: Protecto Wrap Company, Denver, CO (US)

(72) Inventor: John R. Hopkins, II, Bow Mar, CO (US)

(73) Assignee: PROTECTO WRAP COMPANY, Denver, CO (US)

( * ) Notice: Subject to any disclaimer, the term of this patent is extended or adjusted under 35 U.S.C. 154(b) by 351 days.

(21) Appl. No.: 14/033,124

(22) Filed: Sep. 20, 2013

(65) Prior Publication Data
US 2015/0014298 A1  Jan. 15, 2015

Related U.S. Application Data

(60) Provisional application No. 61/846,513, filed on Jul. 15, 2013.

(51) Int. Cl.
| | |
|---|---|
| *H05B 1/02* | (2006.01) |
| *H05B 3/34* | (2006.01) |
| *H05B 3/14* | (2006.01) |
| *B32B 37/20* | (2006.01) |
| *B32B 38/10* | (2006.01) |

(52) U.S. Cl.
CPC ............... *H05B 3/34* (2013.01); *B32B 37/203* (2013.01); *B32B 38/10* (2013.01); *H05B 3/145* (2013.01); *B32B 2305/345* (2013.01); *H05B 2203/011* (2013.01); *H05B 2203/026* (2013.01); *Y10T 156/1062* (2015.01); *Y10T 156/125* (2015.01)

(58) Field of Classification Search
CPC .... H05B 3/34; H05B 3/145; H05B 2203/011; H05B 2203/026; Y10T 156/1062; Y10T 156/125; B23B 37/203; B23B 38/10; B23B 2305/345
USPC ......... 219/481, 494, 213, 538, 543, 548, 542, 219/528
See application file for complete search history.

(56) References Cited

U.S. PATENT DOCUMENTS

| | | | |
|---|---|---|---|
| 2,368,689 | A | 2/1945 | Thomas |
| 4,509,999 | A | 4/1985 | Sandor |
| 4,776,141 | A | 10/1988 | Powell |
| 4,832,090 | A | 5/1989 | Krenkel et al. |
| 5,027,572 | A | 7/1991 | Purcell et al. |
| 5,218,793 | A | 6/1993 | Ball |
| 5,899,026 | A | 5/1999 | Williams et al. |

(Continued)

FOREIGN PATENT DOCUMENTS

GB      2433186      6/2007

OTHER PUBLICATIONS

Calorique, Ltd. Technical Information Sheet, 1999.

(Continued)

*Primary Examiner* — Mark Paschall
(74) *Attorney, Agent, or Firm* — Marsh Fischmann & Breyfogle LLP (57) ABSTRACT

Provided herein is a self-adhesive underlayment and an apparatus for its manufacture. The apparatus is operative to remove portions of release sheets covering upper and lower adhesive membranes and compress resulting exposed adhesive surfaces of the membranes to upper and lower surfaces of a flexible heating element.

6 Claims, 9 Drawing Sheets

(56) References Cited

U.S. PATENT DOCUMENTS

| | | | |
|---|---|---|---|
| 5,961,869 | A | 10/1999 | Irgens |
| 6,098,343 | A | 8/2000 | Brown et al. |
| 6,276,421 | B1 * | 8/2001 | Valenti ................. B26D 7/1863 |
| | | | 156/256 |
| 6,305,130 | B1 | 10/2001 | Ackerman, Jr. |
| 6,401,401 | B1 | 6/2002 | Williams |
| 6,401,402 | B1 | 6/2002 | Williams |
| 6,479,117 | B1 | 11/2002 | Phillips et al. |
| 6,546,679 | B1 | 4/2003 | Bushberger |
| 6,725,610 | B2 | 4/2004 | Murphy et al. |
| 7,022,631 | B2 | 4/2006 | Schmid |
| 7,488,523 | B1 | 2/2009 | Muncaster et al. |
| 7,934,531 | B2 * | 5/2011 | Book ......................... C09J 5/06 |
| | | | 156/230 |
| 2003/0124292 | A1 | 7/2003 | Unterreiter |
| 2003/0178121 | A1 | 9/2003 | Hopkins et al. |
| 2005/0011140 | A1 | 1/2005 | Ackerman et al. |
| 2005/0144865 | A1 | 7/2005 | Ellingson |
| 2006/0101726 | A1 | 5/2006 | Collins |
| 2008/0105363 | A1 * | 5/2008 | Ford .......................... E06B 1/62 |
| | | | 156/153 |
| 2009/0200285 | A1 * | 8/2009 | Raidt .................... F24D 13/022 |
| | | | 219/213 |
| 2010/0126663 | A1 * | 5/2010 | Kalkanoglu ............ C08L 95/00 |
| | | | 156/289 |

OTHER PUBLICATIONS

Carlisle Coatings & Waterproofing, Inc., Product Installation Instructions, 2004.

Easy Heat(R) Warm Tiles(R) literature. Copyright 2007. Self adhesive underfloor heater for use in tile applications.

PWC Anti-Fracture Membrane literature. Copyright 2007. Bitumen anti-fracture membrane with fabric bonding surface.

* cited by examiner

SELF-ADHESIVE RADIANT HEATING UNDERLAYMENT AND APPARATUS FOR MANUFACTURE

CROSS REFERENCE

This application claims the benefit of the filing date of U.S. Provisional Application No. 61/846,513 having a filing date of Jul. 15, 2013, the entire contents of which is incorporated herein by reference.

FIELD

The present disclosure relates broadly to heated underlayments. More particularly, aspects of the disclosure relate to a self-adhesive radiant heating underlayment and an apparatus and method for its manufacture.

BACKGROUND

Heated underlayments are utilized in various construction industries. For instance, radiant in-floor heating systems typically utilize hot fluids circulating through tubes (hydronic systems) or electric current through cables (electrical resistance systems) installed in concrete slabs or attached to a subfloor and covered with a pourable floor underlayment. Hot fluids circulating through the tubes or electrical resistance in the cables warm the underlayment and the floor covering above. In roofing applications, heated panels are sometimes disposed beneath shingles or roofing panels to allow for heating the overlying roof surface in order to remove ice.

SUMMARY

Provided herein is a self-adhesive radiant heat underlayment that may be utilized in various applications including, without limitation, roofing and flooring. The heating underlayment has an adhesive backing that allows for conveniently adhering a flexible heating element in place prior to applying a material over the top surface thereof. In a further arrangement, the heating element is a self sealing element that allows for conductors of the heating element to be connected to an electrical source and subsequently sealed within a waterproof casing.

According to a first aspect, a system and method (i.e., utility) provides a heated underlayment. Generally, the utility includes a flexible heating element including a substantially planar body having top and bottom surfaces. Typically, such a flexible heating element includes first and second conductors extending substantially parallel to its lateral edges and one or more resistor elements, such as carbon fibers or printed carbon pathways, extending between the conductors. In the present utility, a first waterproof adhesive material layer or sheet has a portion of its top surface adhered across at least a portion of the bottom surface of the flexible heating element. One or more portions of the top surface of the first waterproof adhesive material layer are covered by one or more release sheets. In one arrangement, these release sheets overly a portion of the first waterproof adhesive material layer that is juxtaposed over a portion of the bottom surface of the heating element. The first adhesive material layer may further include a release sheet is attached to its bottom surface. Accordingly, removal of this release sheet exposes an adhesive surface that may be utilized to adhere the flexible heating element to an underlying surface. A second waterproof adhesive material layer or sheet has a portion of its bottom surface adhered across at least a portion of the top surface of the heating element. One or more portions of the bottom surface of the second waterproof adhesive material layer are covered by one or more release sheets.

The first and second adhesive layers (e.g., upper and lower membranes) may be utilized to encapsulate the heating element after the heating element is adhered to a surface. In such an arrangement, the first and second adhesive membranes disposed on opposing sides of the heater element may be wider and/or longer than the width and/or length, respectively, of the flexible heating element. Facing surfaces of the portions of the membranes that extend beyond the lateral edges or ends of the heating element may be covered with release sheets. According, by removing these release sheets these facing surfaces of the upper and lower membranes may be adhered together and thereby filly encapsulate and thereby waterproof the heating element, for instance, after the heater element has been attached to a surface and electrically connected to a power source. This arrangement may also allow for waterproofing the electrical connection to the power source.

In one arrangement, the first adhesive waterproof membrane is adhered to the bottom surface of the flexible heating element between first and second conductors extending substantially parallel to the lateral edges of the heating element. Likewise, the second adhesive waterproof membrane is adhered to the top surface of the flexible heating element between first and second conductors extending substantially parallel to the lateral edges of the heating element. In such an arrangement, a user may access the conductors of the heating element to make electrical connections therewith free of interference of the membranes, In a further arrangement, the lower membrane may further include an exposable strip that extends beyond the edge of the upper membrane. This strip may be covered by another release sheet. Once exposed, this strip may be utilized to adhere and overlying element (e.g., shingle) to the heating assembly.

Flexible adhesive material layers may be formed of any materials that provide desired qualities. In one arrangement, the adhesive material layer or layers are formed from non-adhesive base layers (e,g., plastic sheets) having one or more surfaces covered with an adhesive coating. In another arrangement, the adhesive material layers are themselves waterproof and adhesive. In such an arrangement, rubberized materials such as bituminous and/or elastomeric materials may be utilized. In other arrangements butyl rubbers may be utilized. In one arrangement, the thickness of the adhesive material layers is at least about 20 mils and more typically at least about 40 mils. Other thicknesses may be utilized as well.

An apparatus for producing the various embodiments of the heated underlayment is also provided. That is, a machine for laminating at least one membrane adapted for attachment to an underlying surface to a bottom surface of a flexible heating element is provided. Further, this machine may be used laminate a second membrane onto a portion of a top surface of the heating element. In various embodiments, facing surfaces of the upper and lower membranes may retain a peel away release liner such that these membranes may be selectively adhered together at a later time.

The apparatus comprises first and second cylindrical rollers mounted along their longitudinal axes in a parallel opposed relationship. These rollers are operative to rotate in a cooperative manner such that when one roller turns the other roller may turn in the opposite direction to compress materials therebetween. In this regard, one side of the rollers will form a pinch or inlet "nip" into which materials are drawn for compression. Accordingly, the apparatus contains means, such as a variable speed electrical motor, to turn at least one of these rollers. The apparatus further comprises a first holder for holding a length of a first membrane having a lower surface with a portion exposed for adhesive attachment to an upper surface of the heating element. A second holder is utilized to hold a length of a flexible heating element. A third holder holds a length of a second membrane having an adhesive surface at least a portion of which is adhered to the top surface of the heating element. The first, second and third holders are in a spaced relationship with one other as well as the first and second rollers to allow materials contained thereon to be received at the inlet nip defined by the rollers. That is, the first membrane, heating element and second membrane are oriented so they may be drawn into the inlet between the rollers in a desired orientation relative to one another. The compressive force applied by the rollers laminates the various materials together to produce the self sealing heated underlayment.

Generally, each the first and second membrane will comprise at least one surface coated by an adhesive material and covered by a release sheet. Prior to being received at the inlet nip for compression into the resulting laminate structure, at least a portion of these release sheets is removed from one adhesive surface of each membrane. That is, in order to laminate the heating element onto the top surface of the first membrane, all or a portion of the release sheet covering the upper adhesive surface of the first membrane may be removed. In this regard, a means for removing the release sheet, such as take-up roll, may be utilized to separate the release sheet from the first membrane's surface prior to that membrane entering the inlet nip. If only a portion of a release sheet is removed to the adhesive surface, the apparatus may further include a cutter for selectively cutting the release sheet at one or more locations at predetermined distances from the longitudinal edge of the membrane. The cutter(s), such as a blade or sharp point, may be disposed such that it scores or cuts through the release sheet but does not structurally damage the membrane underneath. Accordingly, the cutter may also contain an adjuster for adjusting the depth of the cut. Again a take-up roll for removing the desired section of the release paper may be utilized that is operable to 'wind-up' the removed section of paper at a rate that is equal to the rate the membranes move in the lamination process. The second membrane may incorporate cutters and take up rolls as well.

In another aspect, a process is provided for producing a self adhesive heated underlayment. The process comprises the steps of providing a first membrane having a lower adhesive surface covered by a release liner and an upper adhesive surface covered by a release liner; providing a flexible heating element and providing a second membrane with a lower adhesive surface covered by a release liner. A portion of the width of the upper adhesive surface of the first membrane is exposed by removing a portion of the release liner. Likewise, a portion of the width of the lower adhesive surface of the second membrane is exposed by removing a portion of its release liner. A lower surface of the flexible heating element and exposed portion of the first membrane are contacted in conjunction with contacting an upper surface of the flexible heating element with the exposed portion of the second membrane. Finally, a compressive force is applied to the materials to continuously laminate a length of the materials together in the desired orientation. In one arrangement, this process is performed using an apparatus that utilizes compressive rollers to draw the materials between the rollers and apply the compressive force to the materials.

DETAILED DESCRIPTION

Disclosed herein are various embodiments of a self-adhesive radiant heating underlayment. Although discussed primarily in relation to the use of a thin carbonic heating element, it will be appreciated that various aspects of the present disclosure may be utilized in various applications (e.g., indoor and/or outdoor applications) and/or with different heating elements including, without limitation, electric cables and/or fluid carrying tubes.

Figure 1:
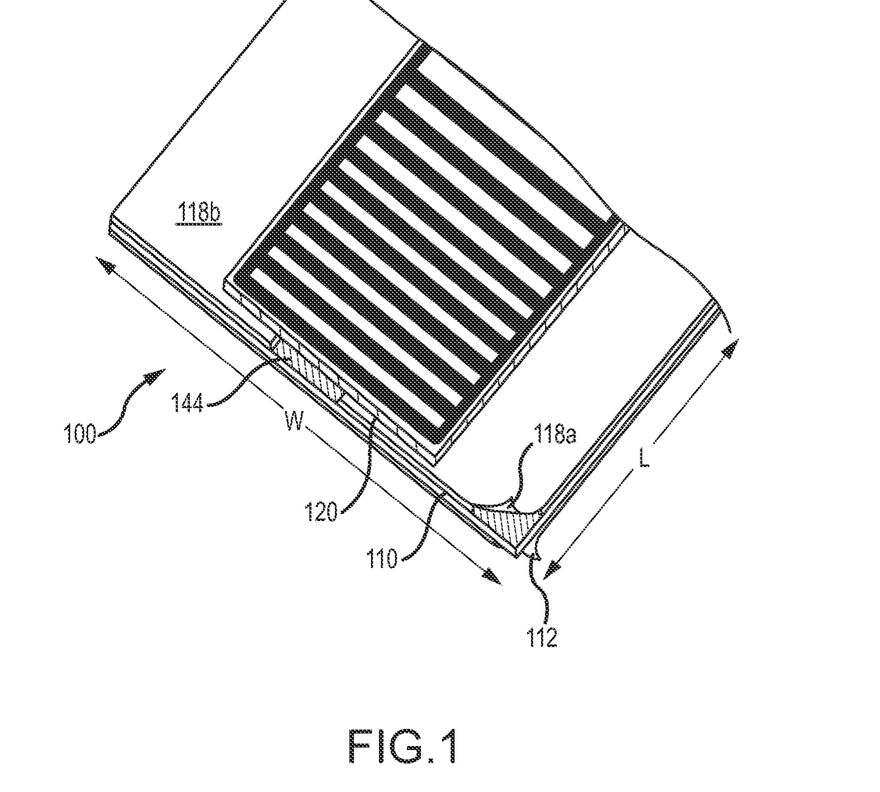
FIG. 1 illustrates a perspective view of a heated underlayment.
Figure 2A:
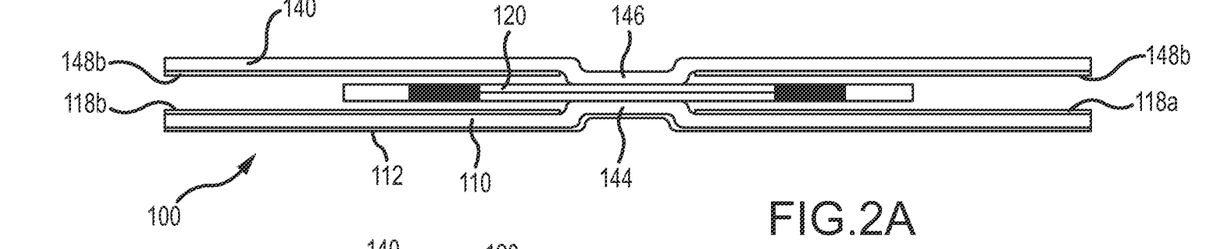
FIGS. 2A-2C illustrate a cross-sectional view of the heated underlayment where the underlayment is unsealed, sealed and applied to a surface, respectively.

FIGS. 1 and 2A illustrate a first embodiment of a self-adhesive heating underlayment 100. As shown, the heating underlayment 100 is formed of laminated layers, which are discussed herein. The total thickness of the heating underlayment is typically less than about 0.25 inches though other thicker and thinner underlayments are possible. In any embodiment, the heating underlayment 100 will include at least the following components: a heating element 120, a lower adhesive membrane 110 and an upper adhesive membrane 140 (not show in FIG. 1 for purposes of illustration). The heater element 120 is disposed between the lower membrane 110 and the upper membrane 140 which both extend beyond the lateral edges of the heater element 120. As shown in FIG. 1, a mid-portion of the bottom surface of the heating element 120 is adhered to a mid-portion 144 of an adhesive top surface of the lower adhesive membrane 110. Likewise, a mid-portion of the top surface of the heater element 120 is adhered to a mid-portion of a bottom adhesive surface of the upper membrane 140. See FIG. 2A.

In the illustrated embodiment, top adhesive surfaces of first and second lateral portions of the lower membrane 110 on either side of the mid-portion 144 adhered to the heater element are covered by first and second release sheets 118a, 118b, which may be removed to expose the adhesive top surfaces of the lower membrane 110. Likewise, bottom adhesive surfaces of third and fourth lateral portions of the upper membrane 140 on either side of a mid-portion 146 adhered to the heater element 110 are covered by first and second release sheets 148a, 148b, which may be removed to expose the adhesive bottom adhesive surfaces of the upper membrane 140. Upon removal of these release sheets, these lateral portions of the upper and lower membranes may be adhered together as discussed below. Further, a bottom adhesive surface of the lower membrane 110 is covered by another release sheet. By removing the lower release sheet 112 from the bottom surface of the lower membrane 110, the bottom adhesive surface may be exposed for adhering the underlayment in a desired location. That is, the exposed adhesive surface may be utilized to adhere the heating element to a floor, subfloor, roof, concrete surface, etc.

The membranes 110, 140 may, in one embodiment, be constructed of a bitumen-containing material. Such a bitumen-containing material may provide both adhesive and waterproof properties allowing, for instance, the lower membrane to both adhesively attach the heating underlayment 100 to a surface and provide waterproofing for that surface. Examples of suitable materials for use in constructing the bitumen material include, without limitation, bitumen-containing materials such as various tar adhesives and rubberized asphalts, as well as certain butyl-rubber compounds. In one embodiment, an adhesive membrane is constructed from a modified, rubberized asphalt material. Such a composition has been found to provide excellent dimensional stability, pliability and adhesion under actual use conditions. However, it will be appreciated that other adhesive materials (e.g., non-bitumen) are possible and within the scope of the present invention.

The membranes may further include a reinforcing layer to improve its strength and dimensional stability. In one arrangement, the reinforcing layer is disposed within a middle portion of the adhesive membrane. In one embodiment, the reinforcing layer comprises a polyester mesh fabric sandwiched between two adhesive bitumen layers. However, it will be appreciated that the membrane may simply comprise a single bitumen-containing layer that does not utilize a reinforcing layer to provide, for example, a membrane with increased flexibility.

The various release sheets 112, 118a, 118b, 148a and 148b are adapted for selective removal (e.g., peel away) their respective adhesive surfaces. These release sheets prevent undesired adhesion of the covered adhesive surfaces. Many different foils, films, papers or other sheet materials are suitable for use in constructing the release sheets. For example, the release sheet may comprise a metal, plastic or paper sheet treated with silicon or other substances to provide a low level of adhesion to the adhesive membrane while maintaining their peel-away qualities.

Figure 3A:
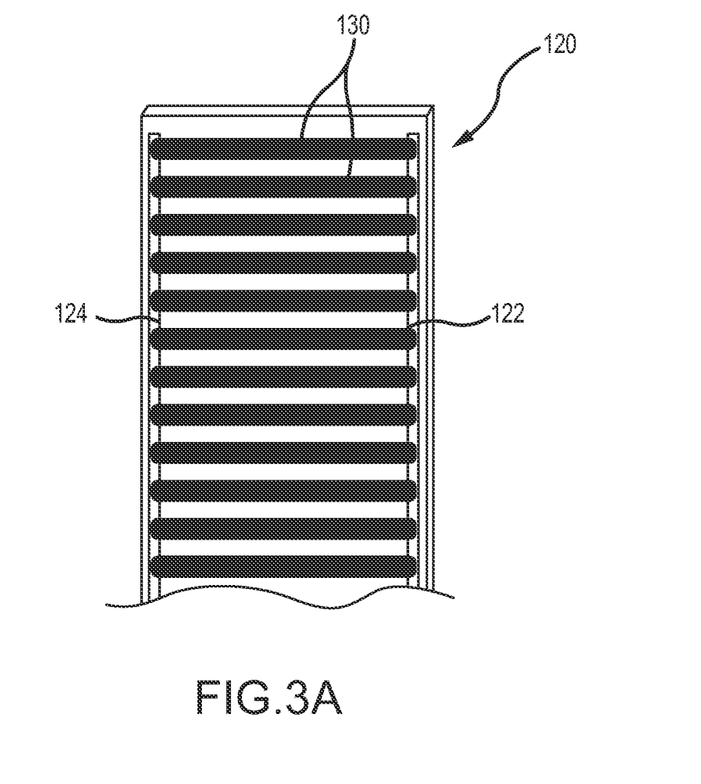
FIGS. 3A and 3B illustrate a top and cross-sectional view, respectively, of a flexible heating element.
Figure 3B:
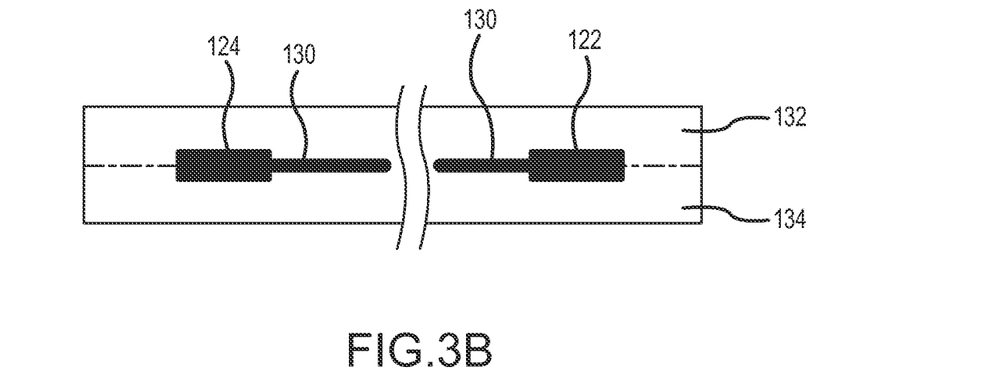

FIGS. 3A and 3B illustrate one embodiment of the heating element 120 that may be utilized with the present self-adhesive heating underlayment 100. As shown, the heating element is formed of a laminated sheet material (e.g., a thin film heating element). The total thickness of the illustrated heating element is approximately 15 mils thick and between 2 inches and 36 inches wide with a length up to about 20 feet. Other thin film heating elements may have different dimensions. In any case, the application of the thin film heating element to the adhesive membrane typically results in a thin structure on top of which roofing, flooring or other covering material may by applied without significantly altering the finished height of the structure.

The heating element 120 has first and second conductors or busbars 122, 124 running along opposing edges thereof. Extending between these conductors 122, 124 are plurality of flat carbon conductors 130. Each of these carbon conductors 130 effectively forms a resistor that generates heat in response to an applied voltage. The busbars 122, 124 and the carbon conductors 130 are disposed between non-conductive substrates. The upper and lower substrates 132, 134 may be heat sealed together to isolate the busbars and resistors. One such thin film heating element is commercially available from CalorIQue, Ltd of West Wareham, Mass. 02576. As shown, each of the carbon resistors 130 is spaced from its immediate adjacent neighbors. This allows for cutting the heating underlayment between adjacent rows of carbon resistors in order to trim the underlayment to a desired length. It will be appreciated that the first and second busbars may be interconnected to a voltage source and/or thermostat to provide controlled application of the electrical energy across the carbon conductors 130. Further, it will be appreciate that adjacent heating elements applied to a floor may be interconnected to a common thermostat and/or voltage source. The heating element may be utilized with 120 volt and/or 240 volt sources.

As discussed above, the electrical buses and carbon resistors are typically disposed between first and second nonconductive substrates or films 132, 134. Typically, these substrates provide some waterproofing for the heater element 120. However, when the heater element is connected to an electrical source and/or the heater element is trimmed (e.g., between the electrical resistors), at least a portion of the buses are exposed. This may be problematic if the underlayment is utilized in a wet application. For instance, if the underlayment is utilized in a shower or as a roofing underlayment, the underlayment may periodically come into contact with water. While most applications provide some overlying waterproofing (e.g., tile, roofing shingles, etc.), the exposure of the buses when interconnecting the heater element to a power source or an adjacent heater element provides a potential location for an electrical short.

Figure 2B:
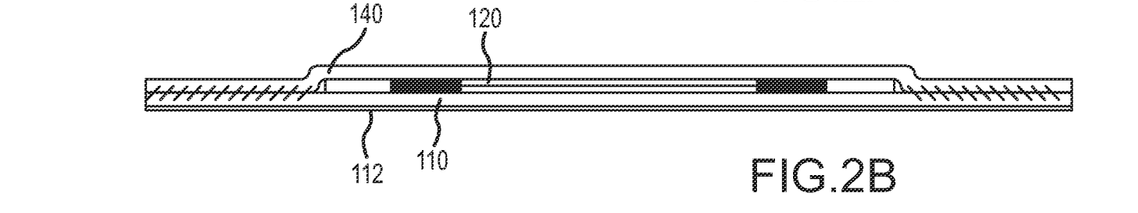
Figure 2C:
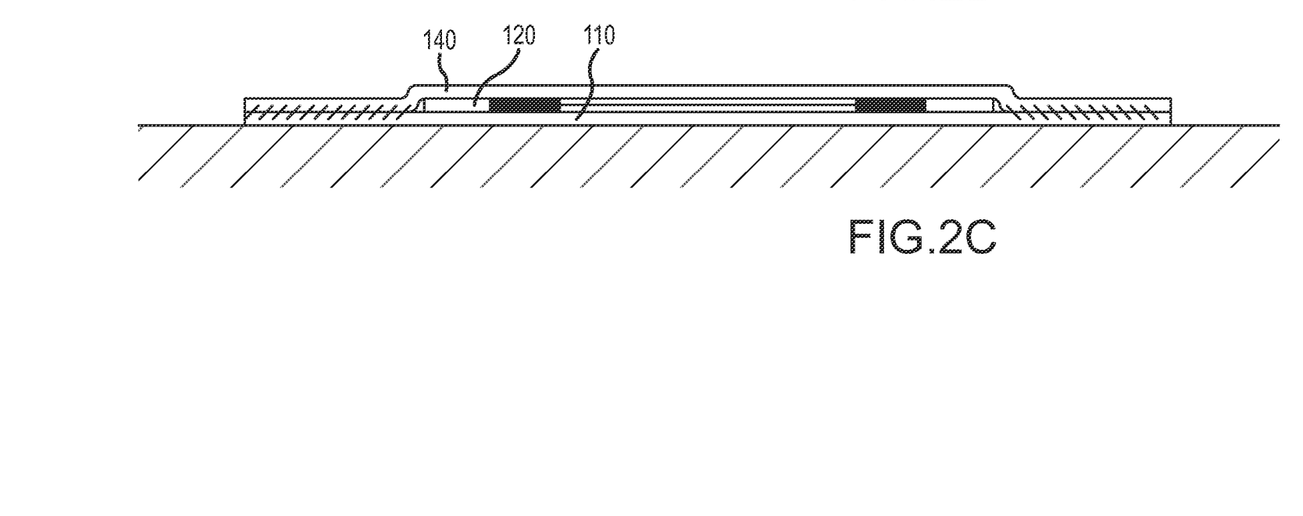

To reduce the likelihood of the buses shorting, the underlayment utilizes the lateral edges (e.g., sealing flaps) of the upper and lower membranes 140, 120 to encase and seal the heating element after the heating element has been trimmed and/or interconnected to an electrical source or adjacent heating element. Specifically, the peel-away release sheets 118a, 118b, 148a and 148b on the facing surfaces of the lower and upper membranes 110, 140 may be removed to expose their underlying adhesive surfaces. The mating portions of the membranes 110, 140 may then be adhered together as illustrated in FIG. 2B. It will be appreciated that when utilizing bituminous membrane materials, the adherence of these materials together may form a cohesive bond. That is, once these membranes 110, 140 are adhered together they form a single cohesive structure. In any case, the resulting structure is waterproof and provides waterproofing isolation for the fully encased heater element 120. In this regard, any interconnections of the heater element 120 to adjacent heating elements and/or power sources may be sealed within the underlayment via the waterproof membranes 110, 140. Further, the release sheet 112 may be removed from the lower surface of the lower membrane 110 to allow adhering the heater element 120 to a surface. See. FIG. 2C. Though illustrated as being adhered to a surface after the sealing flaps of the upper and lower membranes are adhered together, it will be appreciated that the lower membrane may be adhered to a surface prior to sealing the flaps together.

As illustrated, the lower membrane 110 and upper membrane 140 are adhesively attached to the heater element at locations between the first and second busbars 122, 124. In such an embodiment, the lateral portions of the membranes 110, 140 covered by the release sheets 118a, 118b, 148a and 148b overlay the busbars. See FIG. 2A, in this regard, prior to adherence of these lateral portions of the membranes together (see, FIG. 2B) these lateral portions or flaps may be manipulates to allow for ready access to the busbars 122, 124 such that electrical connections thereto may be made.

Figure 4A:
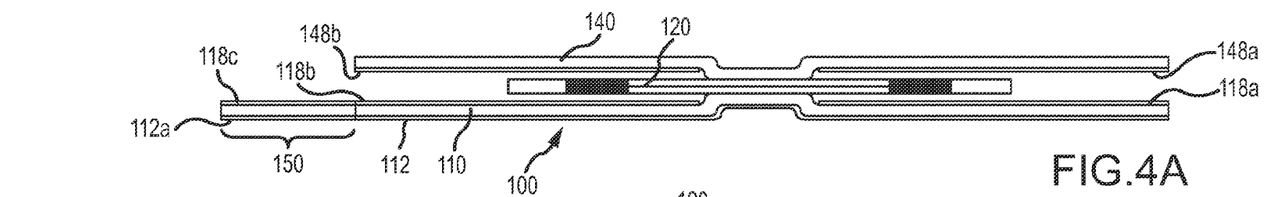
FIG. 4A-4D illustrate a further embodiment of a heated underlayment.
Figure 4B:
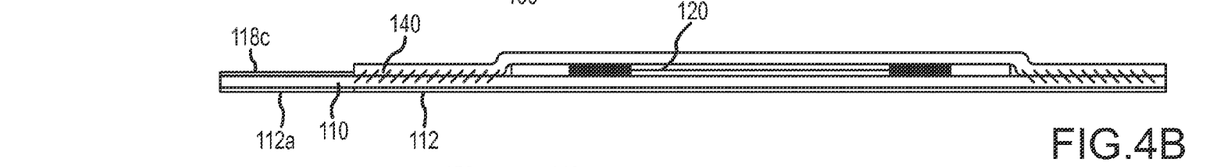
Figure 4C:
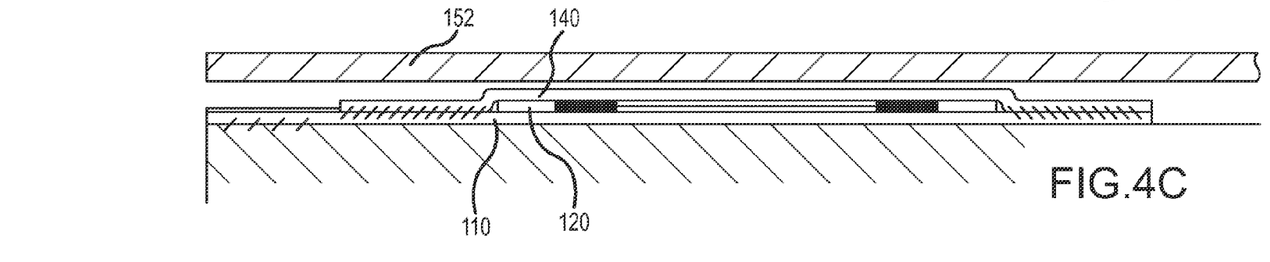
Figure 4D:
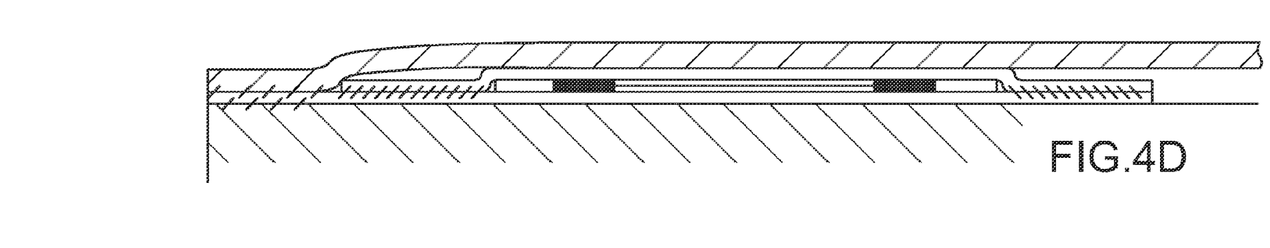
Figure 5A:
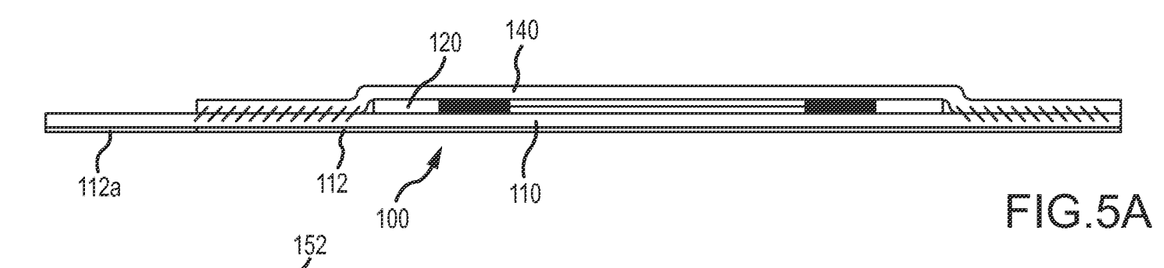
FIGS. 5A-5C illustrate a yet further embodiment of a heated underlayment.
Figure 5B:
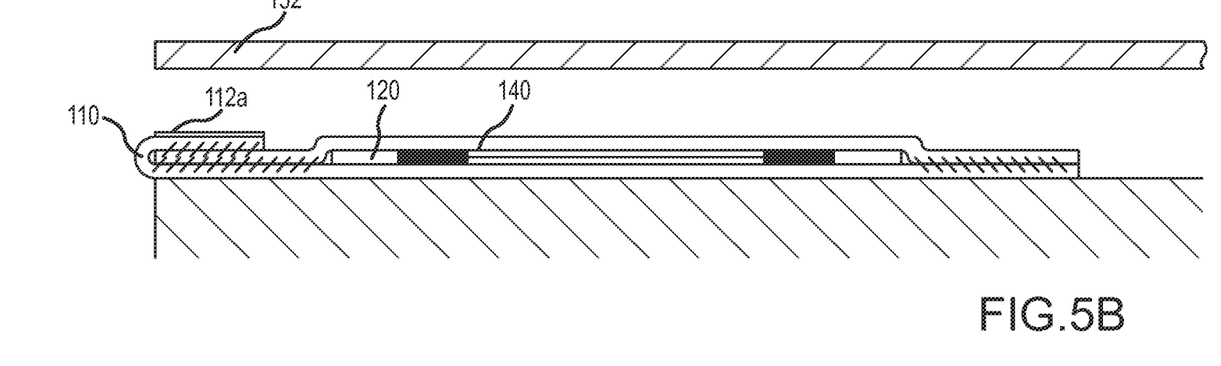
Figure 5C:
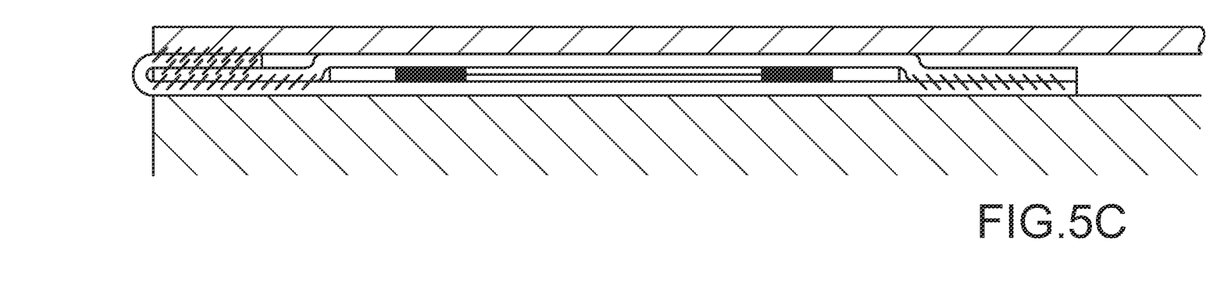

In a further arrangement, the lower adhesive membrane may have a width that is greater than the width of the heating element and/or an upper membrane to define an attachment section 150 on a top surface of the lower membrane 110. See FIGS. 4A and 4B, this attachment section may include a separate release liner 118c. In this regard, adjacent underlayments may be lapped. When utilizing the modified rubberized asphalt discussed above, this may allow for creating a cohesive bond between adjacent underlayments. That is, such underlayment maybe a joined to form a unitary membrane over a surface. Alternatively, the attachment section may be exposed to adhere an overlying element (e.g., roofing shingle 152. See FIGS. 4C and 4D. In a similar embodiment, the attachment section 150 may be adapted for adherence over the upper membrane. See. FIGS. 5A-5C. In this embodiment, the attachment section 150 may include a separate release sheet 118c on its upper adhesive surface and a separate release sheet 112b on its bottom surface.

In any embodiment, the upper surface of the upper membrane 140 may include a protective coating. In one embodiment, an aluminum scrim layer (e.g., grounding layer; not shown) may be adhered to the upper surface of the upper membrane to provide a grounding mechanism. In other embodiments, plastic sheeting may be utilized to, for example, provide UV protection for the heating underlayment if the heating underlayment is exposed during use.

Use of the heating element 120 with the adhesive membrane 110 allows for producing a thin flexible heating underlayment 100 that may be stored in a roll prior to application. Further, the adhesive surface of the membrane conveniently holds the heating element in place prior to application of an overlying element to the top surface of the heating element 120. However, the release sheet prevents the heating element from adhering to a surface prior to being correctly positioned. For instance, while the release sheet is in place, the underlayment may be unrolled and locating in a desired position. Once located, the release sheet may be pulled back on itself to expose the adhesive membrane, which may adhere to the underlying surface.

Figure 6:
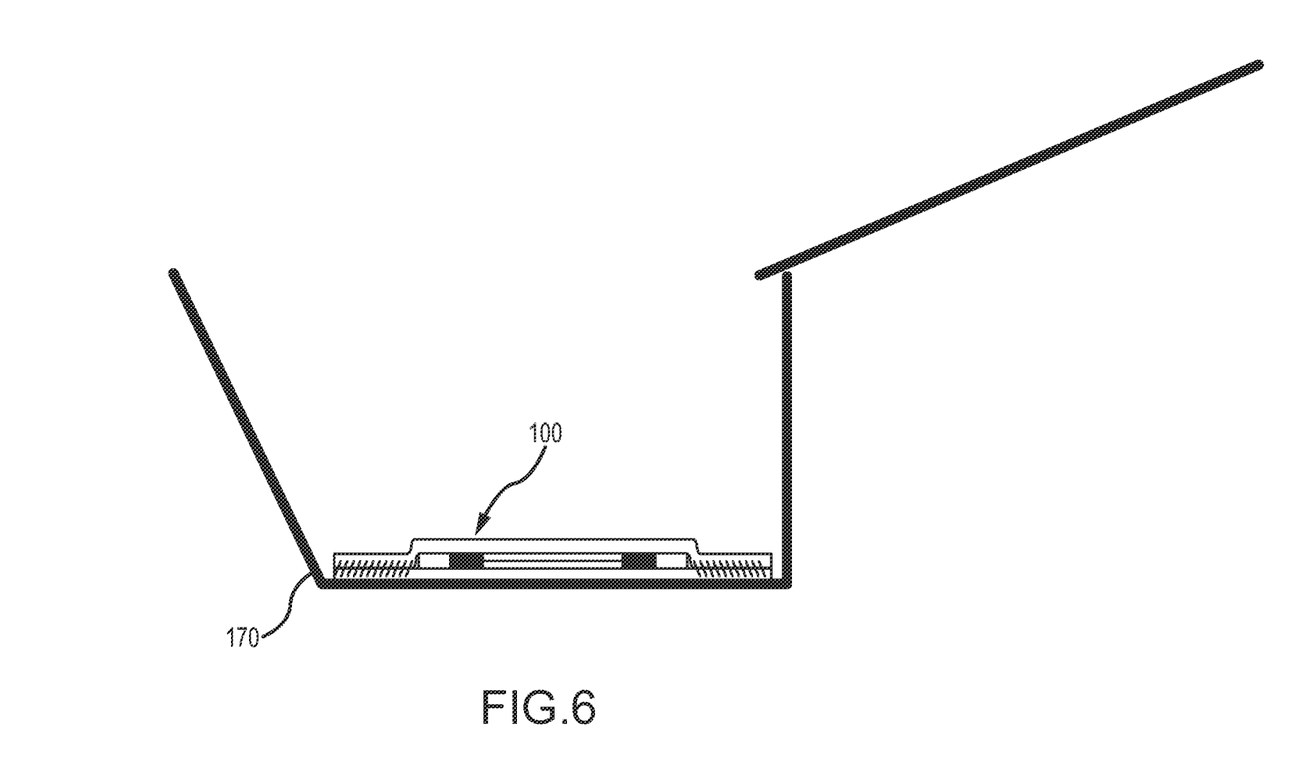
FIG. 6 illustrates a heated underlayment applied within an interior of a gutter.

Another significant benefit of utilizing the waterproof membranes of the present invention is that waterproofing is provided for the heater element and an underlying surface. In this regard, it will be noted that the self-adhesive heating underlayment may be utilized in wet applications (e.g., roofing, showers, etc.). Specifically, the waterproofing capabilities allow use of the heated underlayment in a number of outdoor applications. One such application is use of the heating underlayment as a roofing membrane. In such an application, the heating underlayment may be utilized as an ice and water shield that not only waterproofs a roof but also provides a means fir heating the roof to remove ice and/or snow therefrom. In another roofing application, the heating underlayment 100 may be sized for receipt within a gutter 170 to prevent ice build-up therein. See FIG. 6. Other outdoor uses for the heating underlayment include, without limitation, use in heated sidewalk and/or heated driveway applications. A further outdoor use includes use in roadway construction (e.g., bridge dock heating) and/or foundation construction applications. In the latter regard, the underlayment may be utilized to waterproof and heat the foundation of buildings. In the former regard, the underlayment may be utilized on highway overpasses that are prone to ice buildup in winter conditions.

Due to nature of the carbon fibers that provide resistive heat, the heating underlayment may be utilized with various different power sources. For instance, the heating underlayment may be utilized with low voltage direct power sources such as may be available from solar-voltaic sources. This may allow using the heating underlayment in remove locations that do not have ready access to a power grid.

Figure 7:
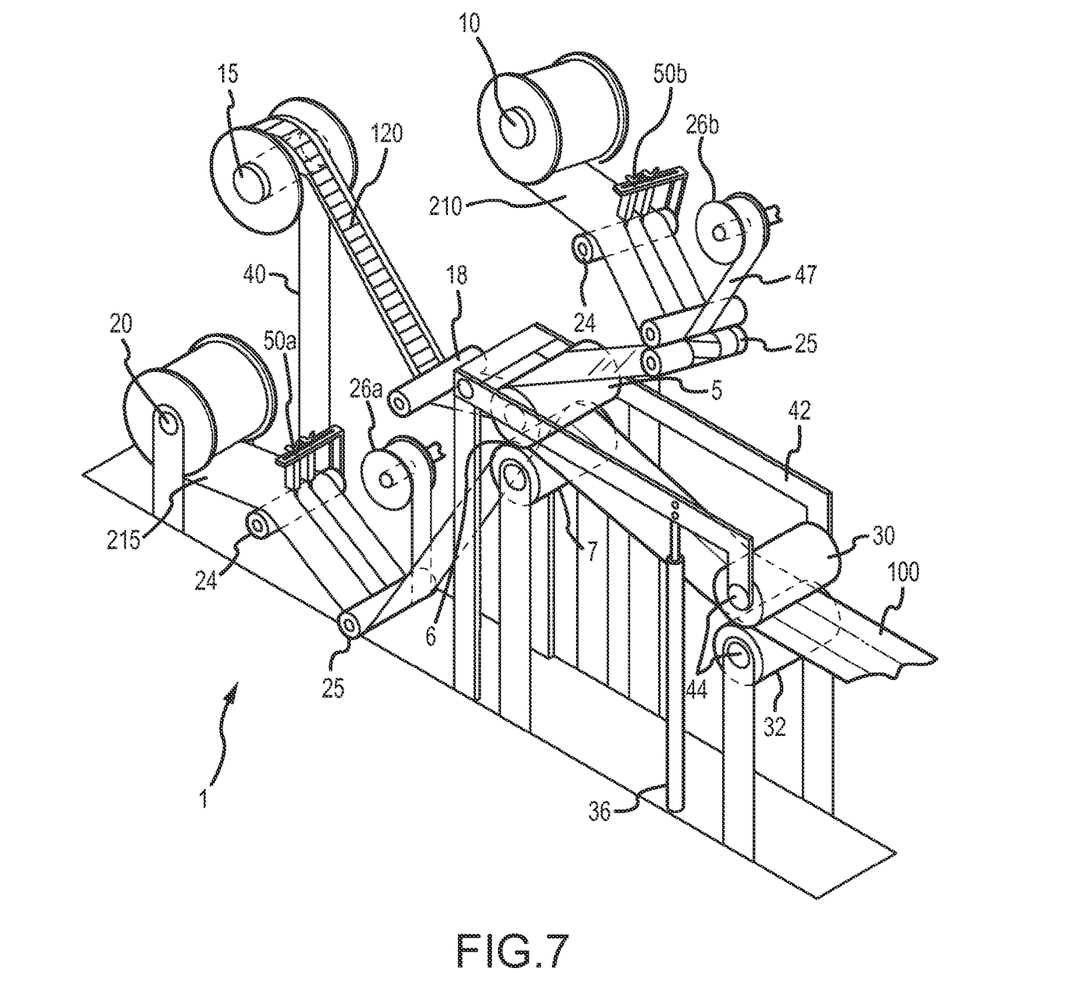
FIG. 7 illustrates an apparatus for use in producing a heated underlayment.
Figure 8:
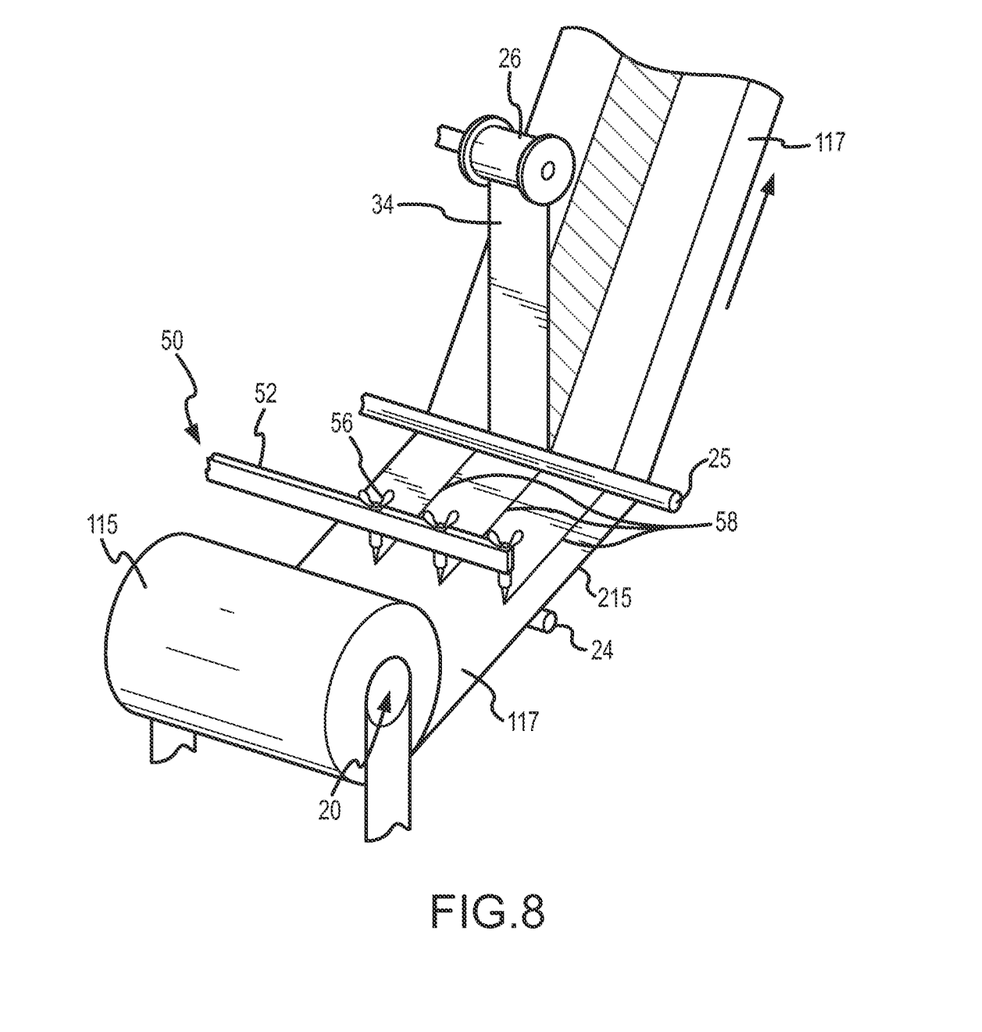
FIG. 8 illustrates a cutting arrangement of the apparatus of FIG. 7 for cutting and removing a portion of a release sheet.
Figure 9:
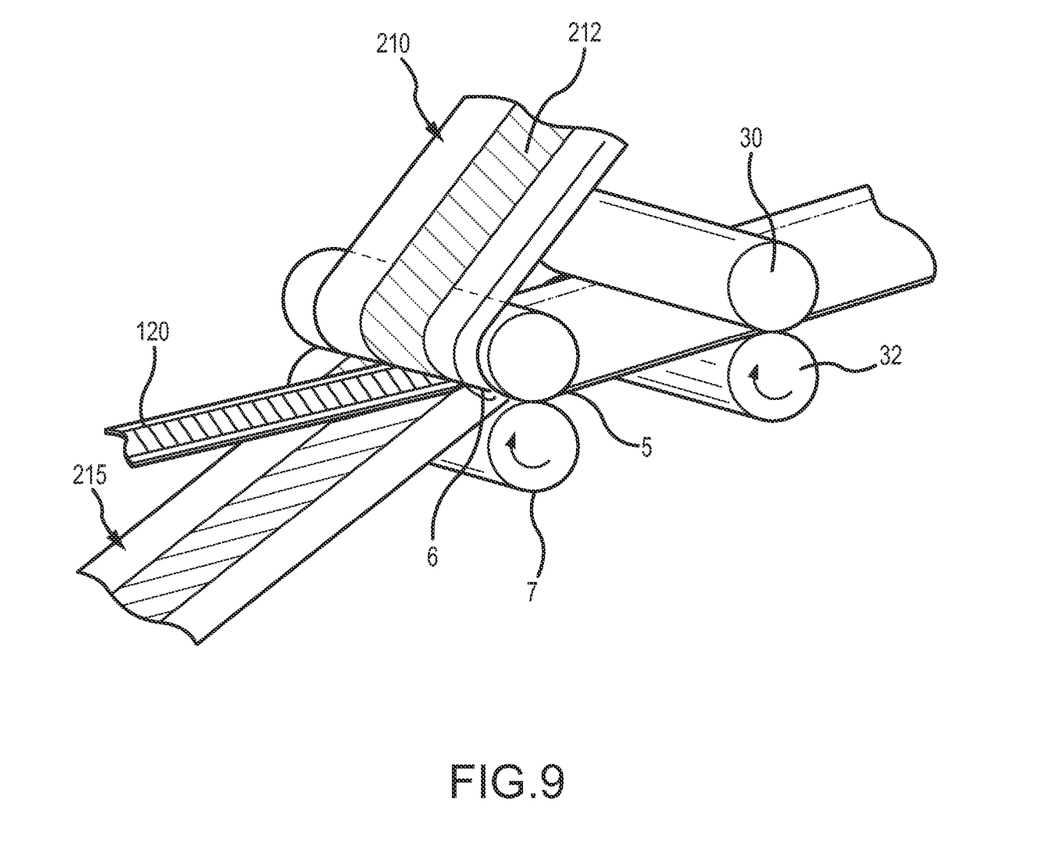
FIG. 9 illustrates the orientation of an upper membrane, heating element and lower membrane in the apparatus of FIG. 7.

Referring to FIGS. 7, 8 and 9, an apparatus 1 for producing the self adhesive underlayment described above is provided. The apparatus is operative to remove all or portion of a release sheets attached to the adhesive surfaces of first and second membranes and laminate these membranes to opposing surfaces of a flexible heating element in a known relationship to produce self adhesive heating underlayment. As shown in FIG. 8, the apparatus 1 comprises first, second and third spindles 10, 15, and 20 for rotably mounting first, second and third supply rolls of a single-sided adhesive membrane 210, a flexible heating element 120 and a double-sided adhesive membrane 215, respectively. During operation, these materials are supplied to a first pair of rollers comprising a drive roller 5 and a compression roller 7 for lamination together. The materials are oriented at the inlet nip 6 defined by the rollers 5, 7 using various tensioning rollers 18, 24 and 25. In addition, the apparatus 1 contains a release sheet cutting means 50a, 50b, a take-up rolls 26a, 26b and a second set of rollers having a second drive roller 30 and a second compression roller 32. The compression rollers 7, 32, take-up rolls 26a, 26b as well as the supply spindles 10, 15, 20, are mounted to a base of the apparatus utilizing various support structures some of which are not shown for illustrative purposes, additionally, the support structures for all the tensioning rollers 18, 24 and 25 are not shown for purposes of clarity. These tensioning rollers are metal cylinders mounted about their central axes operable to rotate as their respective membrane/spacer materials are drawn over them. Each of these tensioning rollers may further comprise a clutch mechanism (not shown) to provide a desired turning resistance to keep their materials taut between the "tensioned" roller and the inlet nip 6 of rollers 5 and 7.

In the illustrated embedment, the drive rollers 5, 30 are attached to a top carrier assembly 42 so that each drive roller 5, 30 is in a parallel opposing relationship a predetermined distance away from its mating compression roller 7, 32. All of the rollers are mounted to their respective structures using a bearing assembly 44 that allows the rollers to freely rotate about their central axes. Additionally, rollers 5, 7, 30, and 32 may contain any suitable non-stick coating such as Teflon or spray-on release agents to prevent the adhesive membranes from sticking to their surfaces during the operation of the apparatus 1.

The illustrated apparatus 1 also contains an optional two-way pneumatic cylinder 36 that is operable to selectively apply variable upward and downward forces to the top carrier assembly 42. In this regard, the two-way pneumatic cylinder 36 is fluidly connected to an air source, a regulating means, and an actuation valve (not shown) for switching between upward and downward operation. The specific type and configuration of these components is incidental to the operation of the apparatus 1 and, therefore, not shown. During operation of the apparatus 1, the pneumatic cylinder 36 applies a predetermined downward force to the carrier assembly 36 that holds the rollers 5, 7 together with a predetermined force and resists "spreading" of the rollers by materials passing there between. It has been found that in orientation, rollers 5, 7 and pneumatic cylinder 36 that provide a compressive force between 150-250 lbs. across the width of the rollers 5, 7 provides a sufficient compressive force to produce a well laminated assembly 100. More particularly, it has been found that between 20-40 lbs. of compressive force per inch width of the laminate assembly 100 provides the best laminating results. The pneumatic cylinder 36 may also apply an upward force to the top carrier assembly 42 to produce an angular displacement around a hinge and thus separate both sets of rollers 5, 7 and 30, 32. This separation allows the membranes 210, 215 and flexible heating element 120 that make up the self adhesive heating underlayment to be "threaded" into the apparatus 1 prior to operation.

As shown in FIG. 7, the first, second, and third spindles 10, 15, and 20 receive supply rolls of their respective materials in a manner that allows these supply rolls to turn. In this regard, when the apparatus 1 operates, the membranes/flexible heating element material contained on the supply rolls are drawn into the inlet nip 6 between the first set of rollers 5, 7. The first spindle 10, holds a supply of a membrane 210 having one adhesive surfaces, which prior to lamination, is entirely covered by a release sheet. For the lamination process a portion of this release sheets is removed to provide a surface onto which the flexible heating element 120 is contacted and adhered. In this regard, the membrane 210 passes over a cut roller 24 and is scored by one or more cutters 52. The membrane then passed through a pair of tensioning rollers 25. At an outlet of the tensioning roller 25, a central portion of the release sheet 47 is separated from the membrane 210 and routed to the take-up roll 26b where it is wound at a rate equal to the membrane's travel through the apparatus 1. The removal of an internal portion of the release sheet 47 between its lateral edges exposes an adhesive surface of the membrane 110. After release sheet removal, the membrane 110 continues toward the drive roller 5 and the inlet nip 6. The membrane's second release sheet 112 (see FIG. 1) contacts the surface of the drive roller 5 such that the membrane's exposed adhesive surface is oriented outward on the drive roller 5 at the inlet nip 6.

The third spindle 20 holds a length of a membrane 215 that contains dual adhesive surface. The bottom release sheet remains in place during the laminating process. Initially, an entire upper adhesive is covered by a release sheet 117. A release sheet cutter 50 is again utilized to remove a portion of the release sheet. The release sheet cutter 50 contains a carrier bar 52, one or more blades 54, and an adjustable holder 56. See FIG. 8. During operation of the apparatus 1, the second membrane 215 moves in the direction shown by the arrow in FIG. 8. That is, the membrane 215 is drawn off the supply spindle 20 and passes over tensioning bar 24. Mounted directly above tensioning bar 24 is the release sheet cutter 50. The release sheet cutter has a carrier bar 52 that is mounted parallel with the tensioning bar 24 and perpendicular to the second membrane 115. The carrier bar 52 supports one or more adjustable holders 56 which in turn support cutting blades 54. The adjustable holders 56 may be selectively positioned along the length of the carrier bar 52 so the blades 54 may cut the release paper at desired points across the width of the membrane 115. Further, the adjustable holder 56 allows adjustment of the blade depth. In this regard, the blade 54 may be adjusted such that it 'scores' or cuts most or all the way through the release sheet 117 without damaging the underlying membrane 115. As will be appreciated, the blades 54 are mounted directly above tensioning roller 24, which provides a firm surface for cutting. As shown, two blades score the release sheet to define a portion that is removed to expose the adhesive surface and a third blade (optional) scores the release sheet 117 to define the attachment section discussed in relation to FIGS. 4A-5C.

During operation of the apparatus 1, the second membrane 215 travels in the direction shown by the arrow in FIG. 8 which draws the blades 54 through the release sheet 117 and leaves cut lines 58 in the release sheet 117. Once the membrane 115 passes under the second tensioning bar 25, a "cut" portion 34 of the release sheet 117 is routed up to the take-up roll 26. The tensioning bar 25 provides a removal point for removing the cut portion 34 of the release sheet 117 from the adhesive layer 51 while preventing a pulling force from being applied to the section of the release sheet 117 currently under the blade 54. The take-up roll 26 rotates at a speed equal to that of the travel of second membrane 115 so the cut portion 34 of release sheet 117 is removed simultaneously with the operation of the apparatus 1. As shown, after the second membrane 115 has passed the second tensioning roller 25, a first portion 130 of this second membrane 115 has an exposed adhesive surface 51, while a second portion 132 remains covered by the release sheet 117.

The second supply spindle 15 (FIG. 7) contains a supply roll of the flexible heating element material 120. The flexible heating element material 105 passes underneath tensioning roller 18 so that it is properly oriented at the inlet nip 6 for contact with the two membranes 210, 215. Referring to FIG. 9, the orientation of the two membranes 210, 215 and flexible heating element material 120 is shown as they enter the inlet nip 6 of the first set of rollers 5, 7. As shown, a lateral edge of the first and second membranes may be aligned. In contract, the flexible heating element is aligned with the exposed portions of the adhesive surfaces of the membranes. That is, the top surface of the flexible heating element material is contacted with an exposed portion 212 of the first membrane 210. This laminates the top surface of the flexible heating element material to the first membrane 210. Simultaneously a bottom surface of the flexible heating element material is contacted with an exposed adhesive surface 217 of the second membrane 215. This laminates the bottom surface of the flexible heating element material to the second membrane 210. The section of the membrane that are still covered by release sheets are compressed together and/or against a surface of the flexible heating element, but the release sheets prevent adherence.

The foregoing description has been presented for purposes of illustration and description. Furthermore, the description is not intended to limit the disclosed apparatuses and method to the forms disclosed herein. Consequently, variations and modifications commensurate with the above teachings, and skill and knowledge of the relevant art, are within the scope of the presented inventions. The embodiments described hereinabove are further intended to explain best modes known of practicing the invention and to enable others skilled in the art to utilize the invention in such, or other embodiments and with various modifications required by the particular application(s) or use(s) of the presented inventions. It is intended that the appended claims be construed to include alternative embodiments to the extent permitted by the prior art.

What is claimed:

1. An apparatus for making a self adhering heated underlayment, said apparatus comprising:

first and second rollers positioned in a parallel opposed relationship to one another to define an inlet nip and an outlet nip, said rollers operative to rotate in a cooperative manner to draw a first membrane, a flexible heating element and a second membrane into said inlet nip;

a first release sheet cutter arrangement adapted to cut a first release sheet covering a lower adhesive surface of said first membrane at first and second locations between lateral edges of said first membrane and remove a first strip portion of said first release sheet between said first and second locations as said first membrane is drawn into said inlet nip;

a second release sheet cutter arrangement adapted to cut a second release sheet covering an upper adhesive surface of said second membrane at first and second locations between lateral edges of said second membrane and remove a second strip portion of said second release sheet between said first and second locations as said second membrane is drawn into said inlet nip;

wherein said inlet nip compresses a first adhesive surface of said first membrane exposed by oval of said first strip portion of said first release sheet to an upper surface of said flexible heater element in conjunction with compressing a second adhesive surface of said second membrane exposed by removal of said second strip portion of said second release sheet to a lower surface of said heater element.

2. The apparatus of claim 1, wherein said first and second rollers further operative to simultaneously receive and contact said first membrane, said flexible heating element and said second membrane at said inlet nip in a known spaced relationship and apply a predetermined compressive force thereto.

3. The apparatus of claim 2, further comprising:
a first holder for holding a length of said first membrane;
a second holder for holding a length of said flexible heating element;
a third holder for holding a length of said second membrane.

4. The apparatus of claim 2, wherein said first adhesive surface of said first membrane exposed by removal of said first strip portion is compressed to said upper surface of said flexible heating element between first and second conductors that extend parallel to first and second lateral edges of said flexible heating element.

5. The apparatus of claim 2, wherein said second adhesive surface of said second membrane exposed by removal of said second strip portion is compressed to said lower surface of said flexible heating element between first and second conductors that extend parallel to first and second lateral edges of said flexible heating element.

6. The apparatus of claim 1, wherein said second release sheet cutter arrangement is further adapted to cut said second release sheet covering said upper adhesive surface of said second membrane at a third location between lateral edges of said second membrane.

* * * * *